(12) United States Patent
Petrus et al.

(10) Patent No.: US 11,963,121 B2
(45) Date of Patent: Apr. 16, 2024

(54) SYNCHRONIZING INDOOR RADIO NODES

(71) Applicant: ARRIS Enterprises LLC, Suwanee, GA (US)

(72) Inventors: Paul Petrus, San Jose, CA (US); Steven A Martin, San Jose, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 155 days.

(21) Appl. No.: 17/465,900

(22) Filed: Sep. 3, 2021

(65) Prior Publication Data
US 2021/0400611 A1 Dec. 23, 2021

Related U.S. Application Data

(63) Continuation of application No. 16/067,706, filed as application No. PCT/US2015/068186 on Dec. 30, 2015, now Pat. No. 11,134,458.

(51) Int. Cl.
*H04J 3/06* (2006.01)
*H04W 56/00* (2009.01)
(Continued)

(52) U.S. Cl.
CPC ... *H04W 56/0015* (2013.01); *H04W 56/0025* (2013.01); *H04J 3/0644* (2013.01);
(Continued)

(58) Field of Classification Search
CPC .......... H04W 56/0015; H04W 56/002; H04W 56/0025; H04W 84/045; H04J 3/0644
See application file for complete search history.

(56) References Cited

U.S. PATENT DOCUMENTS

2011/0216660 A1 9/2011 Lee et al.
2011/0319084 A1 12/2011 Meshkati et al.
(Continued)

FOREIGN PATENT DOCUMENTS

CN 104185274 A 12/2014
KR 20100114350 A 10/2010
(Continued)

OTHER PUBLICATIONS

Office Action corresponding to Canadian Application No. 3,010,312, 3 pages, dated Nov. 25, 2021.
"Canadian Patent Appl. No. 3,010,312, Office Action, dated May 29, 2020".
"Extended European Search Report, Application No. 15912193.8, dated Jul. 5, 2019".
(Continued)

*Primary Examiner* — Bo Hui A Zhu
(74) *Attorney, Agent, or Firm* — Steven Stupp

(57) ABSTRACT

A communication technique for synchronizing a set of radio nodes is described. In this communication technique, the radio node arbitrates (e.g., using a precision time protocol or PTP) with the other radio nodes based on a selection technique to select a synchronization master in the set of radio nodes. This synchronization master may be selected to have a predefined performance based on a type of communication environment of the set of radio nodes. For example, the type of communication environment may include overlap between at least one of the radio nodes in the set of radio nodes and a macrocell in a cellular-telephone network, or may exclude overlap between the set of radio nodes and the macrocell. Moreover, the synchronization master may specify time, frequency, and phase synchronization for the set of radio nodes. Thus, when the synchronization master is different from the radio node, the radio node synchronizes with the synchronization master.

20 Claims, 6 Drawing Sheets

(51) Int. Cl.
*H04W 36/00* (2009.01)
*H04W 84/04* (2009.01)

(52) U.S. Cl.
CPC ........ *H04J 3/0667* (2013.01); *H04W 36/0066* (2013.01); *H04W 84/045* (2013.01)

(56) References Cited

U.S. PATENT DOCUMENTS

| | | | |
|---|---|---|---|
| 2012/0184311 A1* | 7/2012 | Yamamoto | H04W 56/002 455/524 |
| 2012/0252503 A1 | 10/2012 | Wu | |
| 2013/0089030 A1 | 4/2013 | Yu | |
| 2013/0122917 A1* | 5/2013 | Yavuz | H04J 3/0638 455/450 |
| 2014/0211782 A1* | 7/2014 | Yamaguchi | H04B 7/026 370/350 |
| 2015/0070211 A1 | 3/2015 | Cheng et al. | |
| 2016/0330709 A1 | 11/2016 | Li | |

FOREIGN PATENT DOCUMENTS

| | | |
|---|---|---|
| WO | 2012148321 A1 | 11/2012 |
| WO | 2015105363 A1 | 7/2015 |
| WO | 2015109528 A1 | 7/2015 |

OTHER PUBLICATIONS

"J.W. Yoon, et al., "Wireless network Synchronization Algorithm Based on IEEE 802.11 WLANs (Wireless Local Area Networks) for Multimedia Services," Journal of the Korea Society of Computer and Information (vol. 13, issue ), pp. 225-232, Nov. 30, 2008", [in Korean; machine translation attached].

"Office Action for corresponding European Application No. 15912193. 8-1205, dated Apr. 30, 2021, 5 pages".

"Office Action, corresponding to Canadian Application No. 3,010,31, dated Feb. 26, 2021, 5 pgs".

"PCT International Preliminary Report on Patentability and Written Opinion, Re: Application No. PCT/US2015/068186, dated Sep. 28, 2016".

* cited by examiner

SYNCHRONIZING INDOOR RADIO NODES

CROSS REFERENCE TO RELATED APPLICATIONS

This application is a continuation of U.S. patent Ser. No. 16/067,706, "Synchronizing Indoor Radio Nodes," by Paul Petrus, et al., filed on Jul. 2, 2018, which claims priority under 35 U.S.C. 371 to International Application No. PCT/US2015/068186, "Synchronizing Indoor Radio Nodes," by Paul Petrus, et al., filed on Dec. 30, 2015, the contents of each of which are herein incorporated by reference.

BACKGROUND

Field

The described embodiments relate to techniques for communicating information among electronic devices, including synchronizing radio nodes in an indoor wireless network.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network.

While many electronic devices communicate with each other via large networks owned by a network operator, it is often difficult to communicate via a cellular-telephone network, e.g., in indoor environments. In particular, in indoor environments the network performance (such as the block error rate and the capacity) of the cellular-telephone network can be degraded or not available at all. Moreover, there are often constraints on the number of base stations (and associated cell towers) that implement so-called 'macrocells' in a cellular-telephone network. Consequently, it can be difficult for the operator of the cellular-telephone network to improve the quality of their service e.g., in indoor environments.

One approach for addressing this challenge is to implement so-called 'small cells,' which typically include radio access nodes that communicate using lower power than macrocells, and therefore provide smaller coverage areas than macrocells. Typically, in order for different small cells to effectively communicate with electronic devices (such as performing handovers, avoiding dropped calls, etc.), the small cells need to be synchronized with each other. Often, small cells can be synchronized by external devices or systems, such as using signals from a global positioning system or a neighboring macrocell. However, in environments where all the small cells cannot communicate with the external devices or systems, it can be difficult to synchronize small cells with each other.

SUMMARY

The described embodiments relate to a radio node (such as an eNodeB) that synchronizes with other radio nodes in a set of radio nodes, which includes the radio node, in a cellular-telephone network. This radio node includes: one or more antenna connectors (which may be connected to an antenna), and an interface circuit that communicates with the other radio nodes in the set of radio nodes. During operation, the radio node arbitrates with the other radio nodes based on a selection technique to select a synchronization master in the set of radio nodes, where the synchronization master specifies time, frequency, and phase synchronization for the set of radio nodes. Moreover, during the selection technique, the synchronization master is selected to have a predefined performance based on a type of communication environment of the set of radio nodes. Then, when the synchronization master is different from the radio node, the radio node synchronizes with the synchronization master.

Note that the set of radio nodes may be located in an indoor venue.

Moreover, at least some of the radio nodes in the set of radio nodes may be unable to receive signals from a global position system.

Furthermore, the type of communication environment may include overlap between at least one of the set of radio nodes and a macrocell in the cellular-telephone network, or may exclude overlap between the set of radio nodes and the macrocell. When there is overlap with the macrocell, the synchronization master: may have a smallest time to first fix in a subset of the set of radio nodes that receive signals from the global position system; and, when the set of radio nodes are unable to receive signals from the global position system, may have a best signal-to-noise ratio during network listen in the set of radio nodes.

Additionally, when the set of radio nodes are isolated without overlap with the macrocell, the synchronization master may detect signals from the global position system within a time interval. Alternatively, when the set of radio nodes are isolated without overlap with the macrocell and are unable to receive signals from the global position system within the time interval, the synchronization master: may have an accuracy less than a threshold; and, otherwise, may have a crystal oscillator with a best accuracy in the set of radio nodes.

In some embodiments, the type of communication environment overlaps with the macrocell when, during network listen, the signal-to-noise ratio is greater than a first threshold and a received signal strength indicator is greater than a second threshold.

Note that the set of radio nodes may communicate with each other using: wired communication; and/or wireless communication.

Moreover, the set of radio nodes may self-organize such that it includes radio nodes that have a characteristic, and the characteristic may: communicate using multicast communication; exclude overlap with the macrocell in the cellular-telephone network; include a delay less than a threshold; and include being located in a radio-frequency neighborhood.

Furthermore, the synchronization master may be selected by majority vote in the set of radio nodes.

Additionally, the arbitration and/or the synchronization may use a precision time protocol (PTP).

Note that the synchronization master may be different than one of the set of radio nodes (i.e., the synchronization master may not be a radio node).

Another embodiment provides a computer-program product for use with the radio node. This computer-program product includes instructions for at least some of the operations performed by the radio node.

Another embodiment provides a method. This method includes at least some of the operations performed by the radio node.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
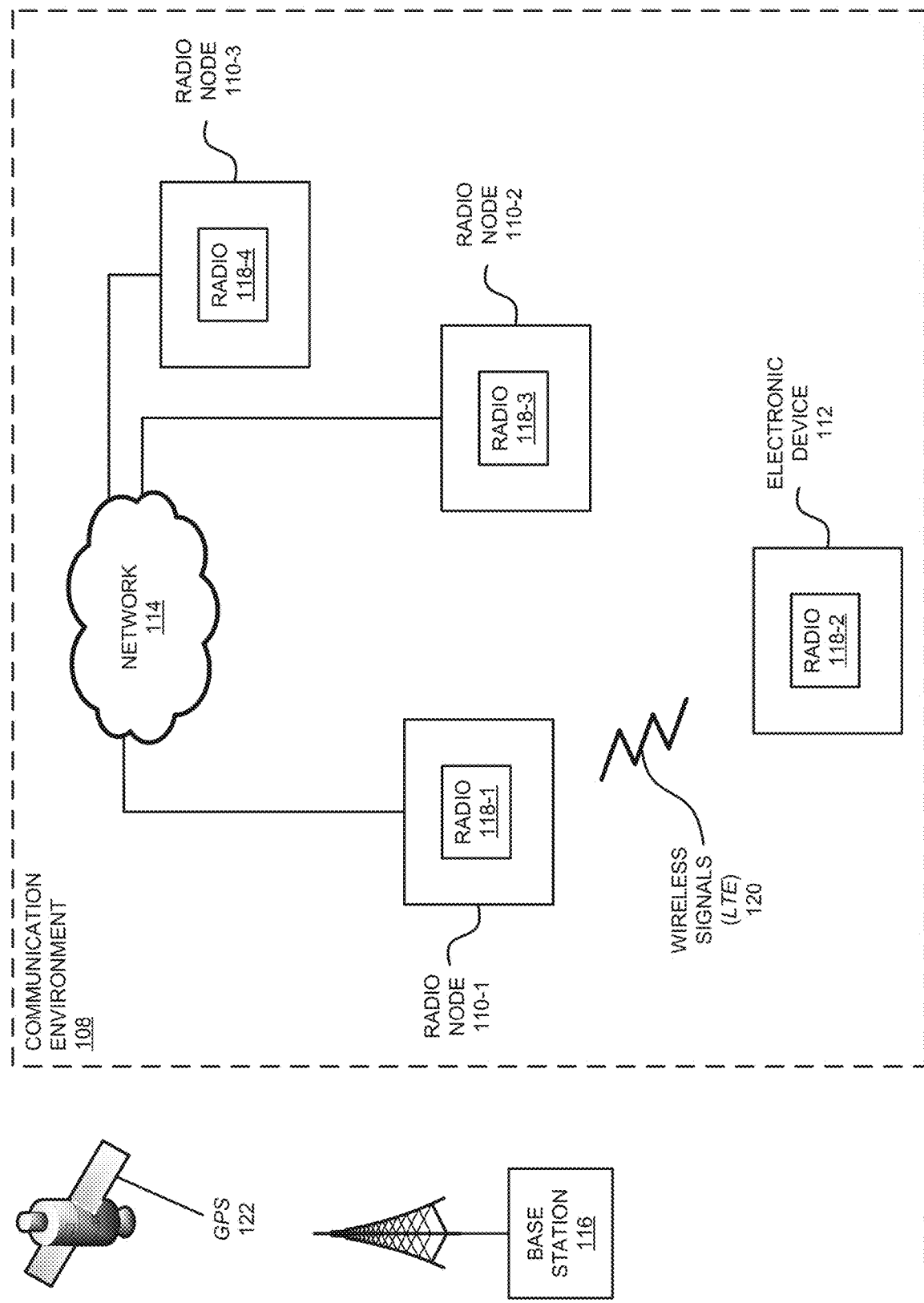
FIG. 1 is a block diagram illustrating electronic devices wirelessly communicating in accordance with an embodiment of the present disclosure.

Table 1 provides timing and frequency requirements in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

A communication technique for synchronizing a radio node (such as an eNodeB) with other radio nodes in a set of radio nodes in a cellular-telephone network is described. In this communication technique, the radio node arbitrates (e.g., using a timing protocol, a precision time protocol, PTP or the like) with the other radio nodes based on a selection technique to select a synchronization master in the set of radio nodes. This synchronization master may be selected to have a predefined performance based on a type communication environment of the set of radio nodes. For example, the type of communication environment may include overlap between at least one of the set of radio nodes and a macrocell in the cellular-telephone network, or may exclude overlap between the set of radio nodes and the macrocell. Moreover, the synchronization master may specify time, frequency, and phase synchronization for the set of radio nodes. Thus, when the synchronization master is different from the radio node, the radio node synchronizes with the synchronization master (e.g., using the PTP).

By facilitating selection of the synchronization master and synchronization of the set of radio nodes, the communication technique may facilitate effective communication between the radio nodes and one or more electronic devices (such as cellular telephones). This capability may be useful when some or all of the radio nodes in the set are unable to receive signals from a global position system. Consequently, by facilitating improved communication with the electronic device, the communication technique may increase customer satisfaction and loyalty.

We now describe some embodiments of the communication technique. A cellular-telephone network may include base stations (and associated cell towers) that implement so-called 'macrocells.' These macrocells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio access nodes providing lower power than macrocells and therefore providing smaller coverage areas than macrocells. It is common to subcategorize 'small cells' even further by ascribing relative general ranges. For example, a 'microcell' might have a range of less than 2 kilometers, a "picocell" less than 200 meters, and a 'femtocell' on the order of 10 meters. These descriptions are for general relative comparison purposes and should not be limiting on the scope of the disclosed embodiments of the communication technique.

However, there are often gaps in the coverage offered by macrocells. Consequently, some users operate local transceivers that provide short-range communication in the cellular-telephone network. These so-called 'femto cells' provide short-range communication (e.g., up to 10 m) for a few individuals.

In addition, larger organizations (such as those with 50-60 users) may operate local transceivers that provide communication in the cellular-telephone network over a range of 100 m. This intermediate-range coverage in the cellular-telephone network can be typically referred to as a 'small cell' as well.

One challenge for operators of cellular-telephone networks is maintaining network performance and quality. For example, it may be difficult to maintain the network performance and the quality of service in high density, indoor or crowded environments. While the use of femto cells and/or small cells can mitigate this challenge, there are still often circumstances where the network performance and quality of a cellular-telephone network is degraded. In particular, as noted previously, proper communication between small cells and electronic devices (such as cellular telephones) typically requires synchronization of the small cells. However, in many communication environments it is difficult to synchronize the small cells. For example, it can be difficult to synchronize the small cells when at least some of the small cells are unable to receive signals with synchronization information from external devices (such as a neighboring macrocell) or systems (such as a global positioning system), such as when the small cells are located indoors or in an indoor venue (such as inside of a building). Moreover, the synchronization difficulty is often complicated by variation in the communication environment. These challenges are addressed in the communication technique described below.

In the discussion that follows, Long Term Evolution or LTE (from the 3rd Generation Partnership Project of Sophia Antipolis, Valbonne, France) is used as an illustration of a data communication protocol in a cellular-telephone network that is used during communication between one or more radio nodes and an electronic device. Consequently, eNodeBs or eNBs are used as illustrative examples of the radio nodes. However, a wide variety of communication techniques or protocols may be readily used for the various embodiments.

FIG. 1 presents a block diagram illustrating wireless communication among electronic devices according to some embodiments. In particular, radio nodes 110 (which are sometimes referred to as a 'set of radio nodes') can communicate LTE data frames or packets using LTE with an electronic device 112 (which is sometimes referred to as 'user equipment' or UE, such as a cellular telephone and, more generally, a portable electronic device). Again, LTE is used as an exemplary cellular protocol and the embodiments herein are not so limited. Moreover, radio nodes 110 may also communicate (via wireless or wired communication, such as Ethernet, in network 114) synchronization information with each other via another communication protocol, such as a precision time protocol or PTP (which is used as an illustrative example), and more generally a communication protocol that is compatible with an IEEE 1588-2002 standard. Note that PTP is a communication protocol that can be used to synchronize electronic devices. In the discussion that follows, 'PTP' refers to an approach for synchronizing, via Internet Protocol (IP), a set of electronic devices according to the IEEE 1588-2002 standard based on a global positioning system, a network listen to a macrocell in a cellular-telephone network or a local timing reference. (Although described in the context of PTP, other or future interfaces could be used, i.e., another interface or protocol for communicating synchronization information among radio nodes 110.)

Figure 2:
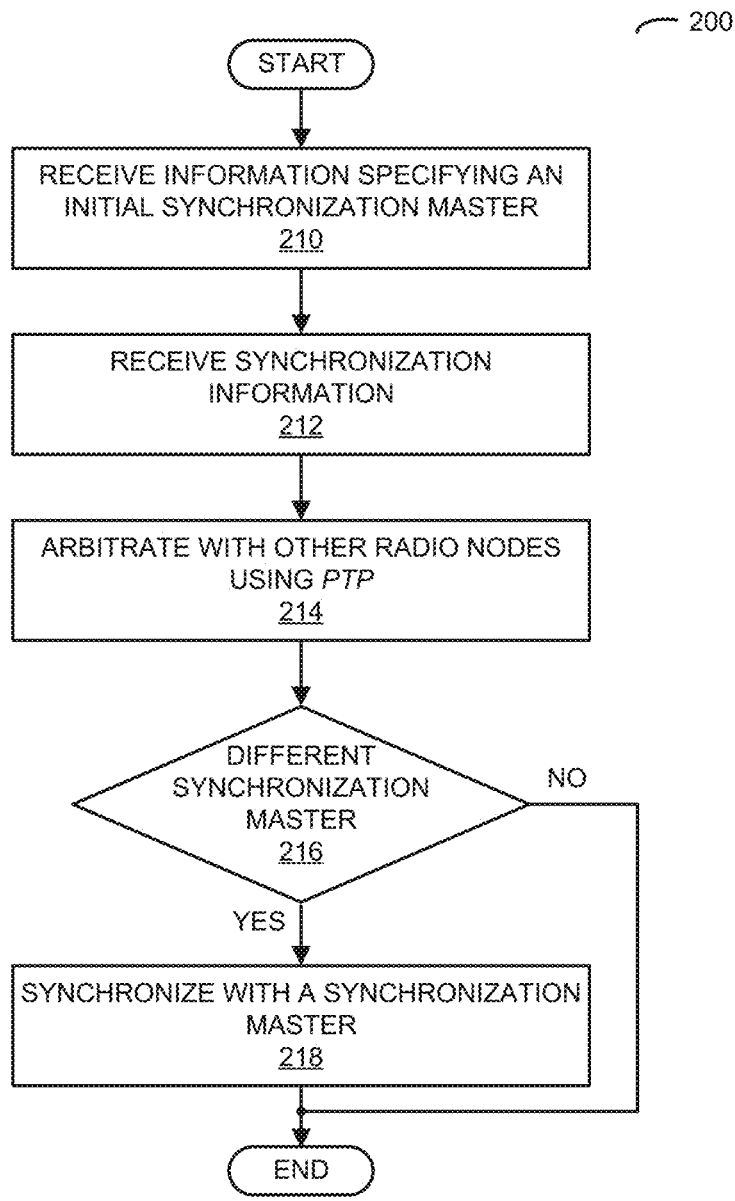
FIG. 2 is a flow diagram illustrating a method for synchronizing a radio node with a set of radio nodes in a cellular-telephone network in accordance with an embodiment of the present disclosure.

In particular, as described further below with reference to FIG. 2, each of radio nodes 110 may perform a synchronization technique by communicating with the other radio nodes 110 via network 114. Using radio node 110-1 as an example, this radio node may arbitrate, using the PTP and network 114, with the other radio nodes 110 based on a selection technique to select a synchronization master in radio nodes 110 (and a remainder of radio nodes 110 may be slaves). For example, the synchronization master may be selected by majority vote in radio nodes 110. Note that the synchronization master may specify time synchronization (for frame duration), frequency synchronization (for the frequency range), and phase synchronization (so that slots are aligned) for radio nodes 110 and, during the selection technique, the synchronization master may be selected to have a predefined performance (such as a synchronization accuracy and, more generally, a source quality) based on a type of communication environment 108 of radio nodes 110. Then, when the synchronization master is different from radio node 110-1, radio node 110-1 may synchronize with the synchronization master using the PTP. In particular, the synchronization master and radio node 110-1 may exchange: an announce message, a synchronization message, a delay-request message and a delay-response message.

As described further below with reference to FIG. 4, during the selection technique, radio nodes 110 may exchange information (such as one or more performance metrics) about their communication with any proximate macrocells in the cellular-telephone network (such as base station 116) based on one or more performance metrics. For example, the one or more performance metrics may include: a received-signal-strength indicator (RSSI) for wireless signals received from base station 116, a signal-to-noise ratio (SNR) of these wireless signals, etc. Based on the one or more performance metrics, radio nodes 110 may determine whether the type of communication environment 108 include overlap between at least one of radio nodes 110 and base station 116, or excludes overlap between radio nodes 110 and base station 116.

If there is overlap (such as when the SNR is greater than 15 dB and the RSSI is greater than −85 dBm), radio nodes 110 may exchange information (such as one or more additional performance metrics) about their communication with a global position system (GPS) 122 during the selection technique. In particular, the synchronization master may be the radio node that has a smallest time to first fix in a subset of radio nodes 110 that receive signals from global position system 122. However, at least some or all of radio nodes 110 may be unable to receive the signals from global position system 122 (such as when the type of communication environment 108 is indoors), and thus may not be able to achieve this condition. In that case, the synchronization master may have a best SNR during network listen (i.e., when listening or receiving the wireless signals from base station 116) in radio nodes 110.

Alternatively, when radio nodes 110 are isolated without overlap with base station 116, radio nodes 110 may, once again, exchange information about their communication with global position system 122 during the selection technique. Then, the synchronization master may be the radio node that detects the signals from global position 122 system within a time interval (such as 10 minutes). However, once again, at least some or all of radio nodes 110 may be unable to receive the signals from global position system 122, and thus may not be able to achieve this condition. In this case, radio nodes 110 may exchange information about their clock accuracy during the selection technique. In particular, the synchronization master may have an accuracy less than a threshold in the PTP (such as ±3 μs). Otherwise, if this condition is also not achieved, the synchronization master may have a local crystal oscillator (or, more generally, a local timing reference) with a best accuracy in radio nodes 110.

In this way, radio nodes 110 may, collectively, determine the synchronization master and the appropriate criteria, based on the type of communication environment 108, for selecting the synchronization master. In particular, when there is overlap, the criterion for the synchronization master (such as the synchronization accuracy) is more stringent or conservative. Alternatively, when radio nodes 110 are isolated, a more-relaxed criterion can be used, including cases where there the synchronization is local within radio nodes 110 (e.g., using the local crystal oscillator) and there is no global synchronization with the cellular-telephone network. In general, communication with global positioning system 122 will offer the most-stringent synchronization accuracy. Because the necessary signals may only be received by a subset of radio nodes 110, the PTP can be used to arbitrate and then disseminate this synchronization information. Alternatively, communication with base station 116 may offer the next-best synchronization accuracy and, when other alternatives are unavailable or unsuitable, a local timing reference may be used. Note that as long as the criterion associated with the type of communication environment 108 is met, proper synchronization may be obtained using the communication technique. Consequently, in the event of a tie during the selection technique, any of the synchronization-master candidates will do, and there is no adverse consequence to selecting one over another.

Note that the synchronization technique may be performed once (such as when radio nodes 110 are turned on), periodically (such as every 50 ms) and/or as needed (such as when there is a change in the type of communication environment 108 or when the synchronization accuracy is degraded).

Figure 5:
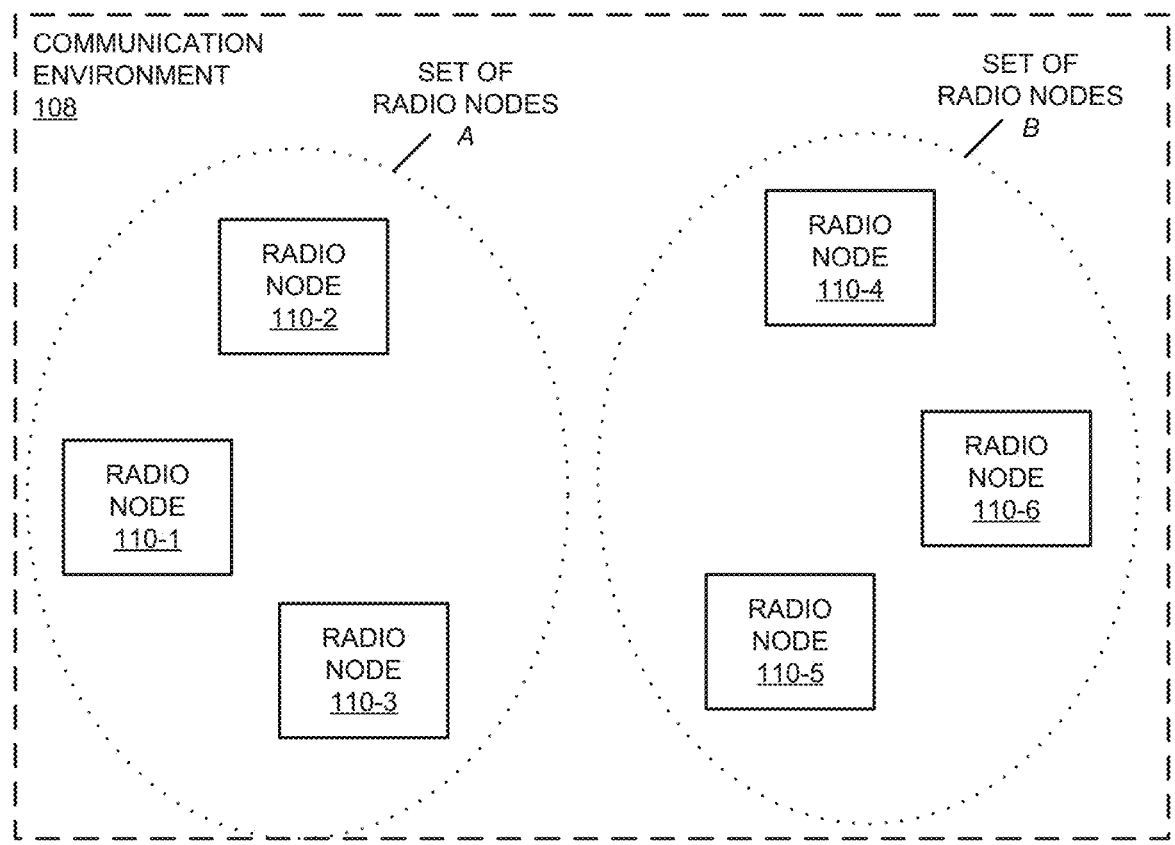
FIG. 5 is a drawing illustrating self-organization of a set of radio nodes in accordance with an embodiment of the present disclosure.

Furthermore, as shown in FIG. 5, in some embodiments radio nodes 110 self-organize such that they include radio nodes that have a characteristic that facilitates selection of the synchronization master. For example, the characteristic may include radio nodes that: communicate using multicast communication; exclude overlap with base station 116; have a delay less than a threshold (such as ±3 µs); and are located in a radio-frequency neighborhood of each other (such as a radio-frequency neighborhood in which communication with radio nodes 110 is characterized by one or more similar performance metrics).

By facilitating selection of the synchronization master and synchronization of radio nodes 110, the communication technique may facilitate effective communication between radio nodes 110 and one or more electronic devices (such as electronic device 112), even when some or all of radio nodes 110 are unable to receive signals from global position system 122. Thus, the communication technique may improve communication performance in a wide variety of types of communication environments, such as when radio nodes 110 are located indoors.

In general, the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

During the communication in FIG. 1, radio nodes 110 and electronic device 112 may wirelessly communicate while: transmitting access requests and receiving access responses on wireless channels, detecting one another by scanning wireless channels, establishing connections (for example, by transmitting connection requests and receiving connection responses), and/or transmitting and receiving frames that include packets (which may include information as payloads).

Figure 6:
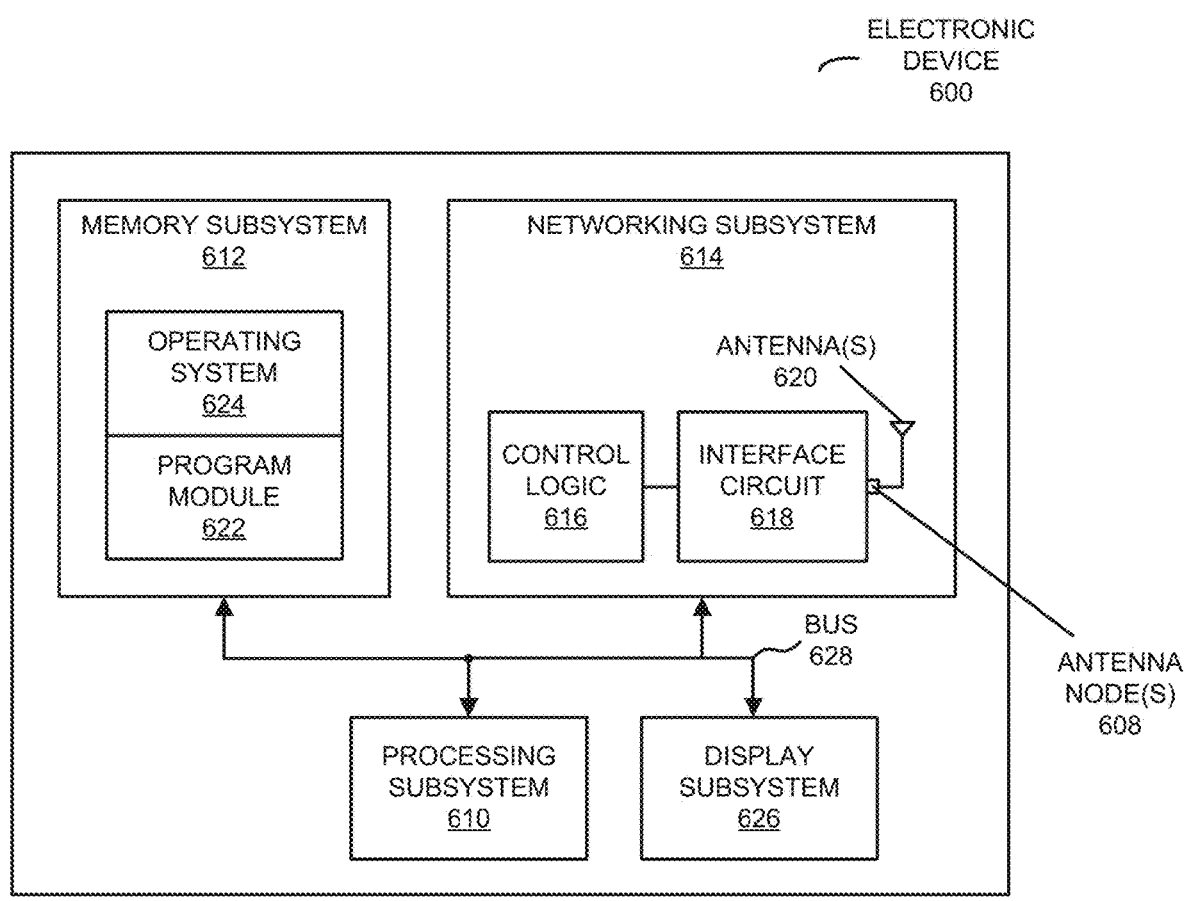
FIG. 6 is a block diagram illustrating an electronic device in accordance with an embodiment of the present disclosure.

As described further below with reference to FIG. 6, radio nodes 110 and electronic device 112 may include subsystems, such as a networking subsystem, a memory subsystem and a processor subsystem. In addition, radio nodes 110 and electronic device 112 may include radios 118 in the networking subsystems. More generally, radio nodes 110 and electronic device 112 can include (or can be included within) any electronic devices with the networking subsystems that enable radio nodes 110 and electronic device 112 to wirelessly communicate with each other. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames that include packets via the connection, etc.

Moreover, as can be seen in FIG. 1, wireless signals 120 (represented by a jagged line) are transmitted by radios 118 in radio nodes 110 and electronic device 112. For example, radio 118-1 in radio node 110-1 may transmit information (such as frames that include packets) using wireless signals 120. These wireless signals are received by radios 118 in one or more other electronic devices (such as radio 118-2 in electronic device 112). This may allow radio node 110-1 to communicate information to other radio nodes 110 and/or electronic device 112. Note that wireless signals 120 may convey LTE frames or packets.

In the described embodiments, processing a frame that includes packets in radio nodes 110 and electronic device 112 may include: receiving the wireless signals with the frame; decoding/extracting the frame from the received wireless signals to acquire the frame; and processing the frame to determine information contained in the payload of the frame (such as the packet).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving frames that include packets.

We now describe embodiments of a method. FIG. 2 presents a flow diagram illustrating a method 200 for synchronizing the radio node with the set of radio nodes in the cellular-telephone network according to some embodiments. This method may be performed by the radio node, such as radio node 110-1 (FIG. 1). During operation, the radio receives information specifying an initial synchronization master (operation 210) in the set of radio nodes. Then, the radio node receives synchronization information (operation 212), which is distributed by the synchronization master.

Moreover, the radio node arbitrates with the other radio nodes (operation 214) based on a selection technique to select (or revise) the synchronization master in the set of radio nodes. For example, the synchronization master may be selected by majority vote in radio nodes. Note that the synchronization master may specify time, frequency, and phase synchronization for the set of radio nodes and, during the selection technique, the synchronization master may be selected to have a predefined performance (such as a synchronization accuracy) based on a type of the communication environment of the set of radio nodes. Next, when the synchronization master is different from the radio node (operation 216), the radio node synchronizes with the synchronization master (operation 218).

In some embodiments, the arbitration (operation 214) and/or the synchronization (operation 218) use the PTP.

In some embodiments of method 200, there may be additional or fewer operations. Moreover, the order of the operations may be changed, and/or two or more operations may be combined into a single operation.

Figure 3:
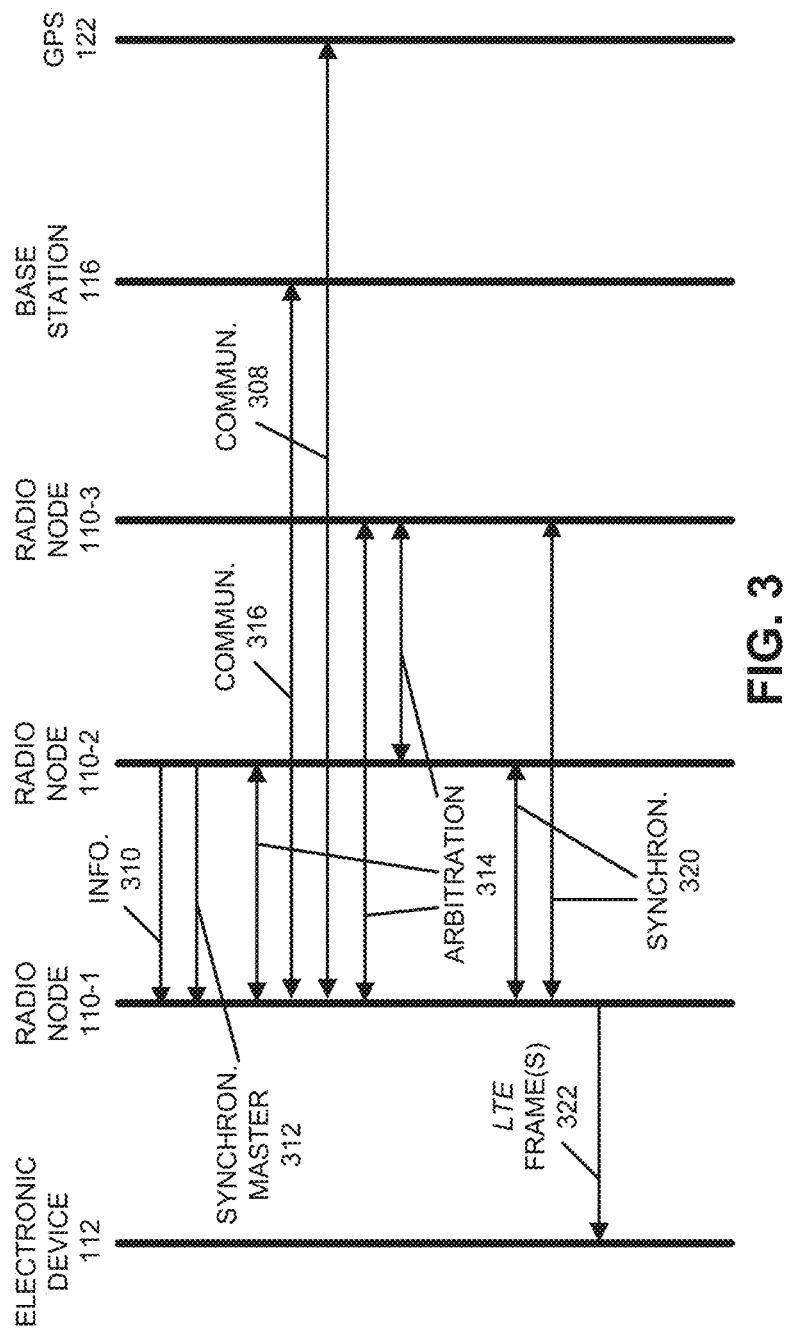
FIG. 3 is a drawing illustrating communication among the electronic devices in FIG. 1 in accordance with an embodiment of the present disclosure.

Embodiments of the communication technique are further illustrated in FIG. 3, which presents a drawing illustrating communication between radio nodes 110 and electronic device 112 according to some embodiments. In particular, during the LTE communication, radio node 110-1 may receive information 310 specifying an initial synchronization master in radio nodes 110 (e.g., radio node 110-2). Then, radio node 110-1 may receive synchronization information 312, which is distributed by the synchronization master.

Moreover, radio node 110-1 may arbitrate 314 with radio nodes 110-2 and 110-3 based on a selection technique to select the synchronization master in the set of radio nodes. During this arbitration 314, radio nodes 110 may exchange communication performance metrics, synchronization information, local time-reference information and/or votes for candidate synchronization masters. For example, radio node 110-1 may communicate 316 with base station 116, and the communication performance metrics may characterize this communication. Alternatively, radio node 110-1 may communicate 308 with global positioning system 122, and the communication performance metrics may characterize this communication.

Once the synchronization master is selected (e.g., based on a majority vote in radio nodes 110), radio nodes 110 may synchronize with the synchronization master. For example, if radio node 110-1 is the synchronization master, radio nodes 110-2 and 110-3 may synchronize 320 with radio node 110-1.

Moreover, radio node 110-1 may communicate one or more LTE frames 322 with electronic device 112. (However, this communication is used as an illustration. More generally, the communication may be with any of radio nodes 110.)

Note that the arbitration and synchronization in FIG. 3 may use the PTP.

In an exemplary embodiment, the communication technique is used to provide small-cell timing and frequency synchronization. Typically, an LTE small cell requires an eNodeB to maintain frequency and timing stability. In particular, frequency stability is usually required for time-division duplex ('TDD') and frequency-division duplex systems for call initiation and mobility services. Moreover, frequency stability may ensure that user equipment (such as cellular telephones) can communicate properly with the eNodeB without signal quality degradation. Furthermore, small-cell synchronization with the cellular-telephone network (such as macrocells) is typically needed for handover capability.

TDD systems also usually require timing and phase stability. In a TDD system, if the frame timing of neighboring eNodeBs is not synchronized, then the user equipment and the eNodeBs may interfere with each other. Furthermore, features, such as a multicast-broadcast single-frequency network (MBSFN), co-operative multipoint systems (COMPs) and enhanced inter-cell interference coordination (eICIC), also usually require timing and phase synchronization.

Frequency and timing requirements for existing communication protocols and services are summarized in Table 1.

TABLE 1

| Protocol | Frequency Requirement (ppb) | Timing Requirement (µs) | Notes |
| --- | --- | --- | --- |
| LTE (FDD) | 100/200 | — | Call initiation and basic mobility services |
| LTE (TDD) | 100/200 | ±1.5 | Time-slot alignment |
| LTE (MBSFN) | 100/200 | ±1.32 | Time alignment of video signals from multiple base stations |
| LTE (eICIC) | 100/200 | ±0.5 | Co-ordination of signals across eNBs |

In general, synchronization can be achieved from a variety of sources, including: a global positioning system, network listen (NL), PTP, network-time protocol (NTP), etc. However, the synchronization accuracy of these sources varies considerably. For example, NTP can provide a timing accuracy on the order of milliseconds, but it can take minutes to hours to obtain the synchronization information; PTP based on a wired network can provide a timing accuracy of less than 1 µs in 5-30 minutes; NL to a macrocell can provide a frequency accuracy of a few parts per billion; an external GPS in an outdoor communication environment can provide a timing accuracy of less than 100 ns; and a local crystal oscillator can provide a timing accuracy of less than 50 µs over 24 hours.

In general, in order to achieve synchronization, as many sources (NTP, PTP, NL, GPS, local crystal oscillator) as possible may be used to obtain accurate frequency, time, phase and location. Moreover, bootstrapping one source to another (e.g., PTP with GPS) may reduce the overall convergence time.

As noted previously, if there is overlap between a small cell in an indoor venue with a macrocell, then synchronization between the small cell and the macrocell is necessary for services, such as handover. Otherwise, a local timing reference can be used to synchronize eNBs. Consequently, during the communication technique the type of communication environment (isolated or overlapping with one or more macrocells in a cellular-telephone network) needs to be determined. This classification can be determined based on performance metrics (such as RSSI and SNR) during NL.

In the communication technique, a cooperative approach among a set of eNBs may be used to select a synchronization master (which is sometimes referred to as a 'grand master') and, thus, to synchronize the set of eNBs (which is sometimes referred to as a 'cluster'). For example, any one of the eNBs in the set of eNBs may synchronize with a cellular-telephone network or a GPS clock, and then become the clock source for the rest of the set of eNBs. In particular, each eNB may have a built-in GPS, NL and PTP capabilities. GPS and NL may be the primary sources used to establish network synchronization. If needed, as a fallback approach, frequency and time can be extracted from a wired network using the PTP. However, more generally, the PTP is primarily used to distribute synchronization information within the set of eNBs.

When one of the eNBs achieves network synchronization through GPS or NL, this radio node may take on the role of the synchronization master in the PTP, and then may distribute a clock to the other eNBs, which become PTP clients. If none of eNBs in the set of eNBs achieves synchronization with an external network, the communication technique may fall back to the eNBs that have a stable clock (e.g., a local timing reference). Then, the other eNBs may synchronize to the eNBs with the stable clock via the PTP.

Note that this approach is robust, flexible and scalable. In particular, redundancy is built into the set of eNBs, because each eNB has GPS, NL and/or PTP. It is highly likely that at least one of the eNBs in the set of eNBs can receive signals from a GPS or a macrocell, thereby increasing the probability of network synchronization. Moreover, the approach is also flexible, because any eNB can become the synchronization master for timing or synchronization distribution. Furthermore, the approach is robust, because, if all sources fail, holdover is maintained and the eNBs can be synchronized by a local stable clock (i.e., the local timing reference). Even if the holdover time expires, as long as all the eNBs in the set of eNBs slide in time and frequency, handover between the eNBs in the set of eNBs and interference is not an issue. Additionally, the approach is scalable, because another eNB can be added to the set of eNBs, and the set of eNBs can self-manage.

In the communication technique, selection of the synchronization master may involve three operations. First, the type of communication environment may be classified according to whether it is isolated or overlapping. In particular, the eNBs may determine if there are other proximate picocells or macrocells using NL detectors. Then, the initial (or primary) source is selected based on performance metrics such as the synchronization time. Next, the performance metrics of the available sources are monitored (e.g., periodically or continuously) to assess the 'goodness' of the sources. Based on the monitoring, the eNBs may maintain a prioritized list of sources. Note that an update rate of entry can be different for different sources. In particular, if one or more performance metrics of the primary source degrade below a predefined threshold(s), the eNBs may switch the primary source to the next source in the list of sources.

Figure 4:
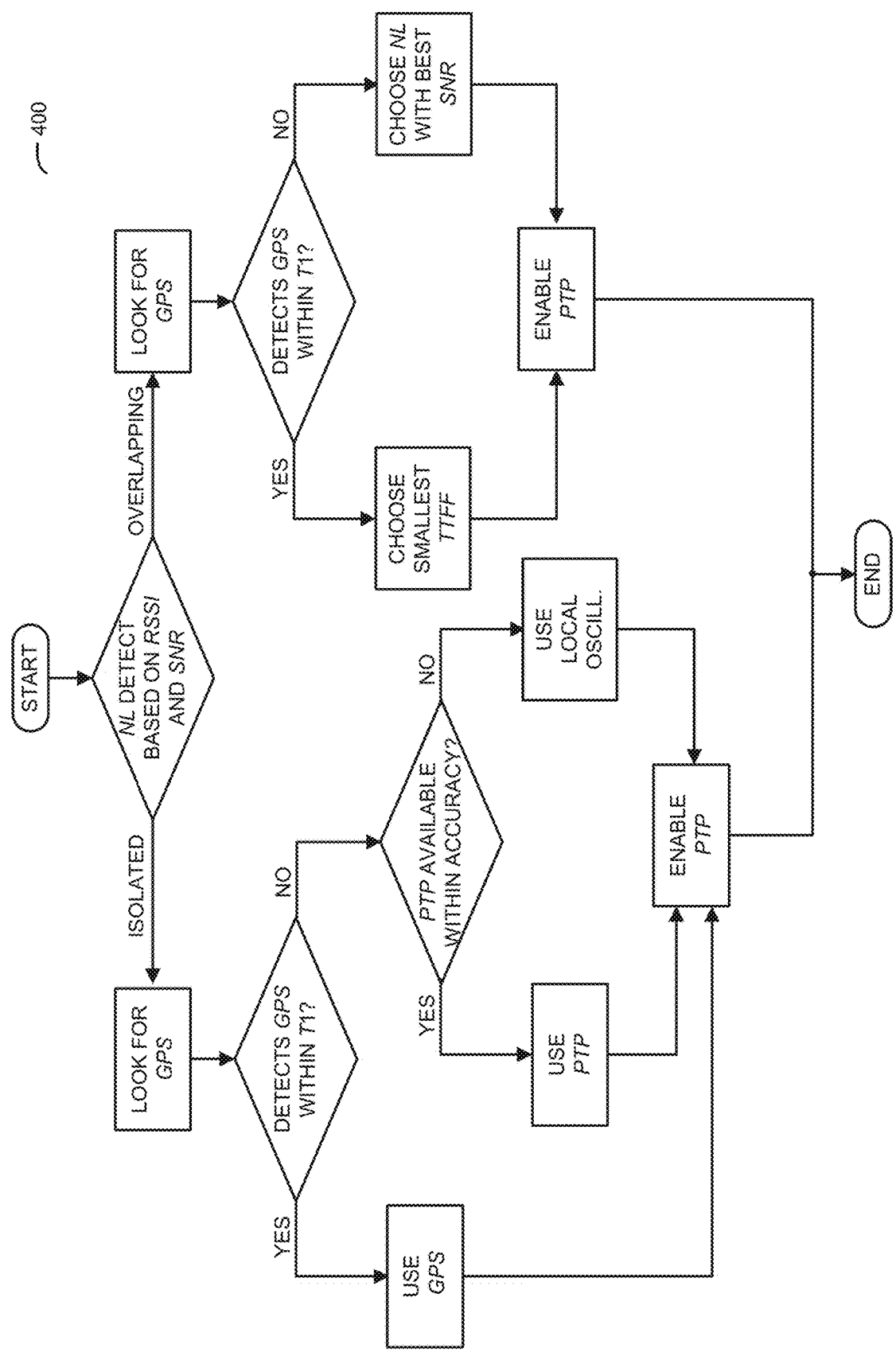
FIG. 4 is a flow diagram illustrating synchronizing a radio node with a set of radio nodes in a cellular-telephone network in accordance with an embodiment of the present disclosure.

These operations are illustrated in more detail in FIG. 4, which presents a flow diagram illustrating a method 400 for synchronizing a radio node with a set of radio nodes in a cellular-telephone network according to some embodiments. During classification and initial source selection, the type of communication environment is classified based on whether it is isolated or overlapping with one or more macrocells in a cellular-telephone network. This classification may specify the synchronization accuracy that is needed, such as when handover needs to be supported. In order to determine the classification, the eNBs may be equipped with NL detectors. Note that the NL may be performed in-band or out-of-band. In principle, NL allows all available macrocell networks. However, in practice, NL may not scan all available LTE bands because of the hardware cost.

Once the type of communication environment is classified, the initial source is selected. If the type of communication environment is 'isolated' or is a so-called 'isolated communication environment,' then the eNBs may look for GPS signals to acquire frequency and timing. If GPS is detected within a timeframe (such as T1 seconds, e.g., 10 minutes), then GPS may become the primary source. The eNB that acquires GPS first may take on the role of PTP synchronization master, and it may then distribute the clock to the other eNBs using the PTP.

However, if GPS is not detected in the isolated communication environment, then neither GPS nor NL is available to use as a timing source. If there is a PTP synchronization master available close by in the set of eNBs, the eNB may look for one and try to achieve synchronization. If the timing and frequency meet the synchronization-accuracy needed, then the synchronization master will be used as the primary source. Otherwise, the communication technique may fall back on the most-stable local crystal oscillator available in the set of eNBs. Then, the PTP may be used to distribute the clock to other eNBs.

Alternatively, if the type of communication environment is 'overlapping' or is a so-called 'overlapping communication environment', then the eNB may still prefer to synchronize with the GPS. If GPS synchronization is achieved, then this may be the primary source. Otherwise, NL may be the next choice.

Once the primary source is selected, other available sources may need to be monitored. In particular, each eNB may maintain a list of timing performance metrics (such as timing, frequency accuracy, RSSI, etc.) for all the available sources and monitor them periodically. If the primary source does not meet the performance-metric thresholds, then the next source in the list may be promoted to be the primary source.

As illustrated in FIG. 5, which presents a drawing illustrating self-organization of a set of radio nodes according to some embodiments, sets of eNBs (or clusters) may be formed for a variety of reasons. For example, the number of PTP clients attaching to a PTP synchronization master may exceed an upper bound or maximum number of eNBs; eNBs may not be able to talk to each other (such as due to isolation in a wired network), so there may be a need to cross subnet boundaries; and/or a PTP link between an eNB and the synchronization master may not meet one or more of the timing performance metrics (e.g., a synchronization time), such that multiple synchronization masters may need to be enabled (resulting in multiple clusters or sets of eNBs).

Moreover, a variety of criteria may be used to select sets of eNBs. In particular, a cluster or set of eNBs may include a maximum number of eNBs, e.g., 16. As long as the number of eNBs is below the maximum number of eNBs, all the sets of eNBs may be included within a cluster. However, if the number of sets of eNBs exceeds the maximum limit, then a new cluster may be formed.

Furthermore, sets of eNBs within a cluster or set of sets of eNBs should be reachable via the PTP, i.e., these sets of eNBs may need to be in the same subnet. However, this capability may depend on the access control list (ACL) of the switches for each subnet. There may be embodiments in which there are multiple subnets within a cluster or set of sets of eNBs.

If there are multiple sets of sets of eNBs, the eNBs may be interleaved so that the eNBs are not lumped together, thereby increasing the probability of creating a synchronization master within each set of eNBs from a GPS reception perspective.

In addition, as noted previously, one or more sets of eNBs may self-organize such that they include eNBs that have a characteristic. For example, the characteristic may include: eNBs that communicate using multicast communication; eNBs that exclude overlap with a macrocell in a cellular-telephone network; eNBs that have a delay less than a threshold; and eNBs that are located in a radio-frequency neighborhood (such as eNBs that have similar RSSIs, SNRs, and/or additional performance metrics).

Note that a set of eNBs may be implemented based on: a multicast communication model; a unicast communication model; or a hybrid communication model. From a configuration perspective, a multicast approach is the simplest. Even in large enterprise networks, it is increasingly common for multicast communication protocols to be deployed, even across multiple subnets. However, some wired networks may not support or allow multicast messages. Consequently, multicast messages may not be able to cross subnet boundaries. Therefore, the clusters or sets of eNBs may need to be limited to subnet boundaries. Moreover, a multicast approach may have a poor quality of service or packet-delay variation compared to a unicast approach. (While fluctuations in the queue time may be a problem, the problem can be overcome by sending large packets, such as 100 byte packets, as opposed to small packets.) Furthermore, multicast messages may: have more asymmetry through routers upstream versus downstream; and flood the network with all the eNBs seeing the delay-response and delay-request messages from the other eNBs. (This issue, however, may be a lesser concern for a small network, such as a small-cell enterprise. For example, in the case of 32 eNBs, 8 exchanges/second/eNB, 3 packets/exchange, 100 bytes/packet, the network throughput is $32 \cdot 8 \cdot 3 \cdot 100 = 76.8$ kB or 614.4 kBps.)

In order to enable a multicast-based cluster, the following technique may be used. When the number of eNBs is less than the maximum number of eNBs, all the eNB may be in a single cluster and they may be inside a subnet. Then, the set of eNBs may be formed by configuring the eNBs with a domain number (where a domain, in which all the clocks reside, is a set of interacting clocks that synchronize to one another using the PTP). This configuration may be pushed from a home eNB management system (HeMS) to the eNB. Note that domain 0 is the default PTP domain.

Then, an announce message may be used to select the best master clock using a best master clock algorithm (BMCA) in an IEEE 1588 standard. eNBs may recognize the synchronization master and may synchronize with the synchronization master through a PTP message exchange process. Note that PTP messages may be sent using user datagram protocol (UDP) datagrams. Moreover, the synchronization and announce messages may be sent as multicast to port number 319, follow-up messages may be sent as multicast to port number 320, and the IP multicast group address may be 224.0.1.129 (for domain 0).

Alternatively, when the number of eNBs is greater than the maximum number of eNBs, then multiple sets of eNBs or clusters can be formed within a subnet. If there are two clusters, each cluster is given a PTP domain number (e.g., 0 and 1). Moreover, each PTP domain may map to a unique port number and multicast group address.

In some embodiments, there may be multiple clusters or sets of eNBs across subnets. In particular, in the case when the clusters need to be formed in a different subnet, each cluster can reuse the domain numbers. For example, if there are two subnets and each has a cluster, then each cluster can use domain 0.

PTP also supports a unicast communication model, as long as the behavior of the PTP is preserved. While a unicast approach may not have some of the issues associated with multicast communication, this approach may have its own issues. In particular, PTP typically assumes that the announce messages are periodically sent by one port and delivered to all other ports of ordinary or boundary clocks within a communication path. If the communication path includes more than two ports, the assumption is that the announce messages are either sent in multicast or that the announce information is replicated to all ports in the communication path using unicast messages.

When multicast communication is not available, another form of discovery (e.g., by configuration) may be required. For example, a slave port may be configured with the addresses of synchronization masters. The slave may request that these synchronization masters transmit unicast announce, synchronization, and delay-response messages to it. However, the slave may not know which eNBs are synchronization masters. Once the synchronization masters are identified, those eNBs may need to push their port numbers to the HeMS. Then, the HeMS may push the port numbers of the synchronization masters to the rest of the client eNBs. While this procedure is cumbersome, it may offer advantages for quality of service, symmetry and traffic flooding.

Another non-standard unicast option is to program unicast IP addresses to all the PTP clients in a cluster. Then, the BMCA may work using unicast, and there may not be a need for additional hand-holding.

In the hybrid approach, a multicast message may be used whenever the information going to many eNBs is the same. It may also be advantageous to send information that is unique to one eNB as a unicast message. In the hybrid communication model, multicast communication may be used for synchronization and announce messages, and unicast communication may be used for follow-up messages.

In particular, announce messages may be sent as PTP multicast messages (e.g., UDP port 319) to the PTP primary address. Moreover, synchronization messages can be unicast or multicast messages. Furthermore, follow-up messages (delay-request, delay-response) may be sent as unicast messages.

Note that, if synchronization is multicast, then there may be less loading on the synchronization master.

Note that is some embodiments there may be multiple synchronization masters in different PTP domains.

In some embodiments, different clusters or sets of eNBs are synchronized. For example, if synchronization masters are all synchronized to GPS or NL, then the synchronization masters may be automatically synchronized with each other. If a synchronization master is deriving its reference from a local clock or a local timing reference and driving the cluster, it may be important to synchronize the synchronization masters of the different clusters. This can be achieved by implementing a boundary clock. Note that a boundary clock can be an eNB in one cluster and synchronization master for another cluster.

We now describe embodiments of an electronic device, such as one of radio nodes 110 and/or electronic device 112 in FIG. 1 that performs at least some of the operations in the communication technique. FIG. 6 presents a block diagram illustrating an electronic device 600 in accordance with some embodiments. This electronic device includes processing subsystem 610, memory subsystem 612, and networking subsystem 614. Processing subsystem 610 includes one or more devices configured to perform computational operations. For example, processing subsystem 610 can include one or more microprocessors, application-specific integrated circuits (ASICs), microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more antenna nodes, such as nodes 608, e.g., a pad, which can be coupled to the one or more antennas 620. Thus, electronic device 600 may or may not include the one or more antennas 620.) For example, networking subsystem 614 can include a Bluetooth™ networking system, a cellular networking system (e.g., a 3G/4G network such as UMTS, LTE, etc.), a universal serial bus (USB) networking system, a networking system based on the standards described in IEEE 802.11

(e.g., a Wi-Fi® networking system), an Ethernet networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a tablet computer, a smartphone, a cellular telephone, a consumer-electronic device, a portable computing device, an access point, a transceiver, a router, a switch, communication equipment, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program module 622 is included in operating system 624 and/or control logic 616 is included in interface circuit 618.

While the preceding discussion used PTP and LTE communication protocols as illustrative examples, in other embodiments a wide variety of cellular-telephone communication protocols and, more generally, wireless communication techniques may be used. Moreover, while a cellular-telephone network was used as an illustrative example, the communication technique may be used with other types of wireless networks. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 622, operating system 624 (such as a driver for interface circuit 618) or in firmware in interface circuit 618. Alternatively or additionally, at least some of the operations in the communication technique may be implemented in a physical layer, such as hardware in interface circuit 618.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A radio node, comprising:
one or more antenna nodes configured to couple to an antenna; and
an interface circuit, coupled to the one or more antenna nodes, configured to communicate with other radio nodes in a set of radio nodes in a cellular-telephone network, wherein the set of radio nodes comprise the radio node, and wherein the radio node is configured to perform operations comprising:
arbitrating with the other radio nodes based on a selection technique to select a synchronization master in the set of radio nodes, wherein the synchronization master specifies time, frequency, and phase synchronization for the set of radio nodes, and
wherein the selection technique comprises:
determining a type of communication environment of the set of radio nodes, wherein the determined type of radio environment specifies a predefined synchronization performance of the synchronization master,
wherein, when the determined type of communication environment excludes overlap between the set of radio nodes and a macrocell in the cellular-telephone network, the synchronization master is a given radio node in the set of radio nodes that:
detects signals from a global position system (GPS) within a time interval;
when the signals from the GPS are not detected by the set of radio nodes within the time interval, has the predefined synchronization performance in a precision time protocol (PTP); and when the set of radio nodes do not have the predefined synchronization performance in the PTP, has a crystal oscillator with a largest stability in the set of radio nodes; and when the synchronization master is different from the radio node, synchronizing with the synchronization master.

2. The radio node of claim 1, wherein the set of radio nodes is located indoors.

3. The radio node of claim 1, wherein the selected synchronization master is a PTP synchronization master in the PTP.

4. The radio node of claim 1, wherein, when the determined type of communication environment comprises overlap between at least one of radio nodes in the set of radio nodes and the macrocell in the cellular-telephone network, the synchronization master is the given radio node in the set of radio nodes that:

detects signals from the GPS within the time interval and has a smallest time to first fix (TTFF) in the set of radio nodes; or has a best signal-to-noise ratio during network listen in the set of radio nodes when the signals from the GPS are not detected by the set of radio nodes within the time interval.

5. The radio node of claim 4, wherein the selected synchronization master is a PTP synchronization master in the PTP.

6. The radio node of claim 1, wherein the determined type of communication environment overlaps with the macrocell when, during network listen, a signal-to-noise ratio associated with a base station in the macrocell is greater than a first threshold and a received signal strength indicator associated with the base station is greater than a second threshold.

7. The radio node of claim 1, wherein the set of radio nodes communicates with each other using wired communication.

8. The radio node of claim 1, wherein the operations comprise self-organizing the set of radio nodes into subsets of radio nodes having different characteristics.

9. The radio node of claim 8, wherein the characteristics comprise: a subset of radio nodes that communicate using multicast communication; a second subset of radio nodes that exclude overlap with the macrocell in the cellular-telephone network; a third subset of radio nodes having a delay less than a threshold; or a fourth subset of radio nodes located in a radio-frequency neighborhood.

10. The radio node of claim 1, wherein the radio node comprises an eNodeB.

11. A non-transitory computer-readable storage medium for use in conjunction with a radio node, the computer-readable storage medium configured to store program instructions, wherein, when executed by the radio node, the program instructions cause the radio node to perform operations comprising:

arbitrating with other radio nodes in a set of radio nodes in a cellular-telephone network based on a selection technique to select a synchronization master in the set of radio nodes, wherein the set of radio nodes comprises the radio node, wherein the synchronization master specifies time, frequency, and phase synchronization for the set of radio nodes, and wherein the selection technique comprises:
determining a type of communication environment of the set of radio nodes, wherein the determined type of radio environment specifies a predefined synchronization performance of the synchronization master, wherein, when the determined type of communication environment excludes overlap between the set of radio nodes and a macrocell in the cellular-telephone network, the synchronization master is a given radio node in the set of radio nodes that:

detects signals from a global position system (GPS) within a time interval;

when the signals from the GPS are not detected by the set of radio nodes within the time interval, has the predefined synchronization performance in a precision time protocol (PTP); and when the set of radio nodes do not have the predefined synchronization performance in the PTP, has a crystal oscillator with a largest stability in the set of radio nodes; and when the synchronization master is different from the radio node, synchronizing with the synchronization master.

12. The non-transitory computer-readable storage medium of claim 11, wherein the selected synchronization master is a PTP synchronization master in the PTP.

13. The non-transitory computer-readable storage medium of claim 11, wherein, when the determined type of communication environment comprises overlap between at least one of radio nodes in the set of radio nodes and the macrocell in the cellular-telephone network, the synchronization master is the given radio node in the set of radio nodes that:

detects signals from the GPS within the time interval and has a smallest time to first fix (TTFF) in the set of radio nodes; or has a best signal-to-noise ratio during network listen in the set of radio nodes when the signals from the GPS are not detected by the set of radio nodes within the time interval.

14. The non-transitory computer-readable storage medium of claim 13, wherein the selected synchronization master is a PTP synchronization master in the PTP.

15. The non-transitory computer-readable storage medium of claim 11, wherein the determined type of communication environment overlaps with the macrocell when, during network listen, a signal-to-noise ratio associated with a base station in the macrocell is greater than a first threshold and a received signal strength indicator associated with the base station is greater than a second threshold.

16. A method for selecting a synchronization master, comprising:

by a radio node:
arbitrating with other radio nodes in a set of radio nodes in a cellular-telephone network based on a selection technique to select the synchronization master in the set of radio nodes, wherein the set of radio nodes comprises the radio node, wherein the synchronization master specifies time, frequency, and phase synchronization for the set of radio nodes, and wherein the selection technique comprises:
determining a type of communication environment of the set of radio nodes, wherein the determined type of radio environment specifies a predefined synchronization performance of the synchronization master, wherein, when the determined type of communication environment excludes overlap between the set of radio nodes and a macrocell in the cellular-telephone network, the synchronization master is a given radio node in the set of radio nodes that:
  detects signals from a global position system (GPS) within a time interval;
  when the signals from the GPS are not detected by the set of radio nodes within the time interval, has the predefined synchronization performance in a precision time protocol (PTP); and
  when the set of radio nodes do not have the predefined synchronization performance in the PTP, has a crystal oscillator with a largest stability in the set of radio nodes; and
when the synchronization master is different from the radio node, synchronizing with the synchronization master.

17. The method of claim 16, wherein the selected synchronization master is a PTP synchronization master in the PTP.

18. The method of claim 16, wherein, when the determined type of communication environment comprises overlap between at least one of radio nodes in the set of radio nodes and the macrocell in the cellular-telephone network, the synchronization master is the given radio node in the set of radio nodes that:
  detects signals from the GPS within the time interval and has a smallest time to first fix (TTFF) in the set of radio nodes; or
  has a best signal-to-noise ratio during network listen in the set of radio nodes when the signals from the GPS are not detected by the set of radio nodes within the time interval.

19. The method of claim 18, wherein the selected synchronization master is a PTP synchronization master in the PTP.

20. The method of claim 16, wherein the determined type of communication environment overlaps with the macrocell when, during network listen, a signal-to-noise ratio associated with a base station in the macrocell is greater than a first threshold and a received signal strength indicator associated with the base station is greater than a second threshold.

* * * * *